United States Patent
Vali et al.

(10) Patent No.: US 10,402,319 B2
(45) Date of Patent: Sep. 3, 2019

(54) APPARATUSES AND METHODS FOR CONCURRENTLY ACCESSING DIFFERENT MEMORY PLANES OF A MEMORY

(71) Applicant: Micron Technology, Inc., Boise, ID (US)

(72) Inventors: Tommaso Vali, Sezze (IT); Andrea Giovanni Xotta, Castelgomberto (IT); Umberto Siciliani, Rubano (IT); Luca DeSantis, Avezzano (IT); Michele Incarnati, Gioia dei Marsi (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/340,976

(22) Filed: Jul. 25, 2014

(65) Prior Publication Data

US 2016/0026565 A1 Jan. 28, 2016

(51) Int. Cl.
*G06F 12/00* (2006.01)
*G06F 12/06* (2006.01)
*G06F 12/02* (2006.01)

(52) U.S. Cl.
CPC ........ *G06F 12/0646* (2013.01); *G06F 12/023* (2013.01); *G06F 12/0238* (2013.01); *G06F 2212/1016* (2013.01); *G06F 2212/251* (2013.01); *G06F 2212/7208* (2013.01)

(58) Field of Classification Search
CPC .......................... G06F 12/0246; G06F 3/0679
See application file for complete search history.

(56) References Cited

U.S. PATENT DOCUMENTS

| | | | | |
|---|---|---|---|---|
| 4,513,372 A | * | 4/1985 | Ziegler | G06F 12/0607 365/189.05 |
| 8,595,411 B2 | | 11/2013 | Selinger et al. | |
| 9,659,664 B1 | * | 5/2017 | Griffin | G11C 16/26 |
| 2004/0212014 A1 | * | 10/2004 | Fujito | G11C 7/1051 257/355 |
| 2008/0126680 A1 | * | 5/2008 | Lee | G06F 3/0613 711/103 |

(Continued)

OTHER PUBLICATIONS

International Search Report and Written Opinion received for PCT/US2015/040346 dated Oct. 30, 2015.

(Continued)

*Primary Examiner* — Ryan Bertram
*Assistant Examiner* — Trang K Ta
(74) *Attorney, Agent, or Firm* — Dorsey & Whitney LLP

(57) ABSTRACT

Apparatuses and methods for concurrently accessing different memory planes are disclosed herein. An example apparatus may include a controller associated with a queue configured to maintain respective information associated with each of a plurality of memory command and address pairs. The controller is configured to select a group of memory command and address pairs from the plurality of memory command and address pairs based on the information maintained by the queue. The example apparatus further includes a memory configured to receive the group of memory command and address pairs. The memory is configured to concurrently perform memory access operations associated with the group of memory command and address pairs.

22 Claims, 5 Drawing Sheets

(56) References Cited

U.S. PATENT DOCUMENTS

| | | | |
|---|---|---|---|
| 2009/0196103 A1* | 8/2009 | Kim | G11C 8/08 365/185.12 |
| 2010/0211737 A1* | 8/2010 | Flynn | G06F 3/0616 711/114 |
| 2010/0293420 A1 | 11/2010 | Kapil et al. | |
| 2010/0329013 A1* | 12/2010 | Shikata | G11C 16/0483 365/185.18 |
| 2011/0208896 A1* | 8/2011 | Wakrat | G06F 12/0246 711/103 |
| 2012/0020161 A1 | 1/2012 | Haukness | |
| 2012/0023347 A1 | 1/2012 | Byom et al. | |
| 2012/0113721 A1 | 5/2012 | Kim | |
| 2012/0173792 A1 | 7/2012 | Lassa et al. | |
| 2013/0166825 A1* | 6/2013 | Kim | G06F 12/0246 711/103 |
| 2013/0212315 A1 | 8/2013 | Steiner et al. | |
| 2013/0212318 A1 | 8/2013 | Toelkes et al. | |
| 2013/0262745 A1* | 10/2013 | Lin | G06F 3/061 711/103 |
| 2013/0290811 A1 | 10/2013 | Liikanen et al. | |
| 2014/0068159 A1 | 3/2014 | Yi et al. | |
| 2014/0089568 A1* | 3/2014 | Chung | G06F 12/0246 711/103 |
| 2015/0193302 A1* | 7/2015 | Hyun | G11C 29/52 714/764 |
| 2015/0380097 A1* | 12/2015 | Sato | G11C 8/08 365/185.03 |

OTHER PUBLICATIONS

First Office Action for ROC (Taiwan) Patent Appl. No. 104124149 dated Jul. 20, 2016 (English translation only).

* cited by examiner

300

| FIELD 1: ADDRESS | FIELD 2: PLANE | FIELD 3: PAGE TYPE | |
|---|---|---|---|
| ADDR0 | PLANE0 | LP | → 1 |
| ADDR1 | PLANE0 | LP | |
| ADDR2 | PLANE1 | LP | → 2 |
| ADDR3 | PLANE2 | UP | |
| ADDR4 | PLANE2 | LP | → 3 |
| ADDR5 | PLANE0 | LP | |
| ADDR6 | PLANE3 | LP | → 4 |
| ADDR7 | PLANE2 | LP | |

APPARATUSES AND METHODS FOR CONCURRENTLY ACCESSING DIFFERENT MEMORY PLANES OF A MEMORY

BACKGROUND

Memories may be provided in a variety of apparatuses, such as computers or other devices, including but not limited to portable memory devices, solid state drives, music players, cameras, phones, wireless devices, displays, chip sets, set top boxes, gaming systems, vehicles, and appliances. There are many different types of memory including volatile memory (e.g., dynamic random access memory (DRAM)) and non-volatile memory (e.g., flash memory). Flash memory architectures may include NAND or NOR architecture.

In non-volatile memories (e.g., NAND flash memories), memory arrays may be divided into planes. Dividing a memory into planes may break up rows or columns into smaller sections for accessing during memory access operations. Breaking the memory up into planes may also present an opportunity to access more than one portion of the memory array concurrently. Typically, concurrent access may require access of memory cells that are coupled to the same respective access line driver, which may limit an ability to concurrently access different planes during random memory access requests.

BRIEF DESCRIPTION OF THE DRAWINGS

FIG. 3 is an exemplary table of a queue according to an embodiment of the present disclosure.

DETAILED DESCRIPTION

Apparatuses and methods for concurrent access of different memory planes are disclosed herein. Certain details are set forth below to provide a sufficient understanding of embodiments of the disclosure. However, it will be clear to one having skill in the art that embodiments of the disclosure may be practiced without these particular details. Moreover, the particular embodiments of the present disclosure described herein are provided by way of example and should not be used to limit the scope of the disclosure to these particular embodiments. In other instances, well-known circuits, control signals, timing protocols, and software operations have not been shown in detail in order to avoid unnecessarily obscuring the disclosure.

Figure 1:
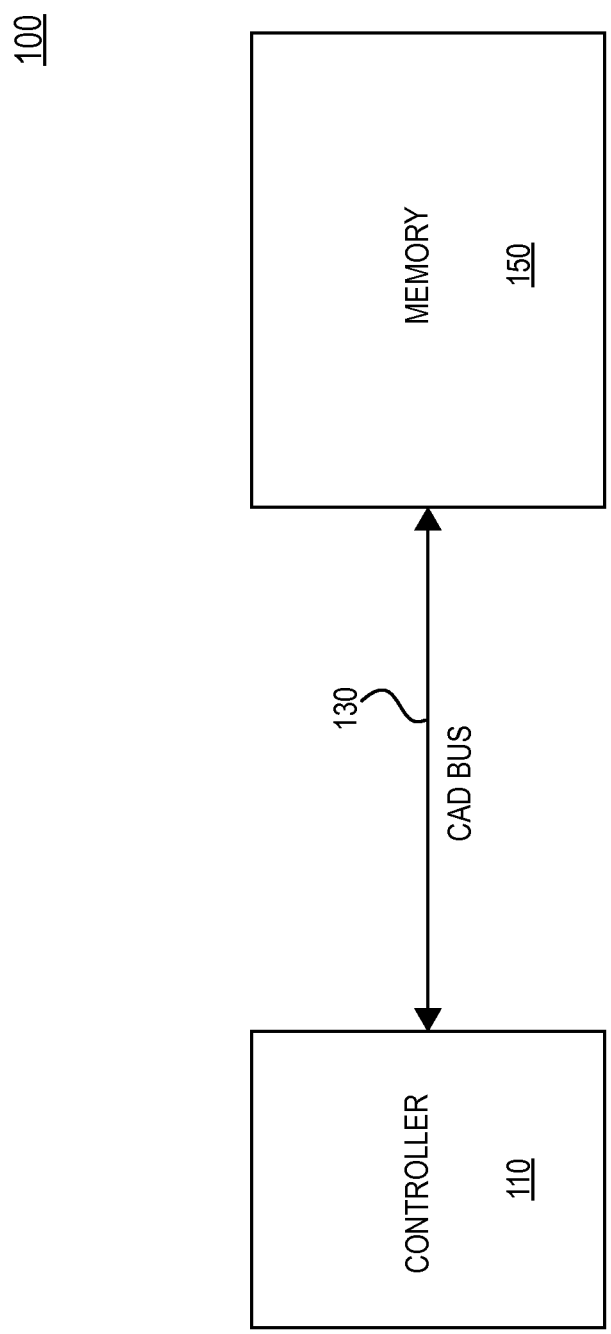
FIG. 1 is a block diagram of a memory system according to an embodiment of the present disclosure.

FIG. 1 is a block diagram of an apparatus 100 (e.g., an integrated circuit, a memory device, a memory system, an electronic device or system, a smart phone, a tablet, a computer, a server, etc.) according to an embodiment of the present disclosure. The apparatus 100 may include a controller 110 (e.g., memory controller) and a memory 150. The controller 110 and the memory 150 may be coupled by a command, address, and data (CAD) bus 130. The memory 150 may be configured to receive commands and/or addresses from the controller 110 over the CAD bus 130, and the memory may be configured to receive data and/or provide data over the CAD bus 130.

In some examples, the memory 150 may be a non-volatile memory, such as NAND, NOR, or PCM flash memory. The memory 150 may include an array of cells organized in multiple memory planes (e.g., partitions). The memory planes may be divided into blocks of memory cell pages. Each page may include a row or column of memory cells that are coupled to a respective access line. The memory 150 may provide voltage on an access line during a memory access operation to erase, program, and/or read from a page of memory cells. The access line voltages required to access data of a page of memory cells may depend on a page type. A page type may be based on a type of memory cell in the page (e.g., SLC, MLC, TLC, etc.) and a level of the memory cells being accessed (e.g., upper page UP, lower page LP, middle page MP, single level cell page). The memory 150 may include circuitry that performs concurrent memory page accesses for two or more memory planes when the memory pages have a common page type. In some embodiments, the memory page accesses are concurrent, for example, when memory access operations for the respective memory pages at least partially temporally overlap. While the memory access operations for the respective memory pages may occur simultaneously, embodiments of the disclosure are not limited to simultaneous memory access operations.

The controller 110 may be associated with (e.g., include) a queue that stores information associated with a plurality of memory command and address pairs. The controller 110 may select a group of command and address pairs from the plurality of memory command and address pairs based on the information stored in the queue. The information stored in the queue for each of the plurality of command and address pairs may include an associated memory plane, and/or an associated page type. The controller 110 may select a group of memory commands and addresses based on the associated memory plane and/or page type.

The memory 150 may be configured to perform concurrent memory operations (e.g., read operations or program operations) for memory planes associated with the received memory command and address pairs. For example, when the group of memory command and address pairs are read commands associated with a common page type, the memory 150 may provide read data associated with each memory command and address pair to the controller 110 over the CAD bus 130. Further, when the group of memory command and address pairs are program commands associated with a common page type, the memory 150 may receive and program data associated with each memory command and address pair. Additionally, the memory 150 may further provide information to the controller 110 over the CAD bus 130 in response to particular commands. The information may indicate, for instance, whether the memory 150 is available to perform a memory operation and/or an amount of time before the memory 150 may become available to perform a memory operation.

During operation, the queue associated with the controller 110 may maintain (e.g., store) information associated with each of a plurality of memory command address pairs. The controller 110 may select a group of memory command and address pairs from the plurality of memory command and address pairs based on the information maintained by the queue. As previously described, in some examples, the information may include memory plane and/or page type, and the controller 110 may select a group of memory command and address pairs based on the plane and/or page type associated with each memory command and address pair. For example, the controller 110 may select a command and address pair to add to the group when associated with a memory plane that is different than the memory planes associated with other command and address pairs of the group, and/or when the command and address pair associated with a page type that is common with the other command and address pairs of the group. The controller 110 may continue to select command and address pairs to be added to the group until an end of the queue is reached or until the group includes a command and address pair directed to each memory plane of the memory 150. In the latter case, the selected group including a command and address pair directed to each memory plane of the memory 150 may facilitate a fully concurrent memory access at the memory 150 (e.g., concurrent memory access of each memory plane of the memory 150). The controller 110 may provide the selected group of memory command and address pairs to the memory 150 via the CAD bus 130 in parallel or serially.

The memory 150 may be configured to concurrently perform memory access operations for memory command and address pairs associated with common page types across two or more memory planes. Typically, during a memory access operation, a procedure for accessing data of a page may be dependent on a page type. That is, to read data from an MLC or TLC page, read voltages that may be provided (e.g., applied) may depend on which level (e.g., bit) of each memory cell of the page is being read. For example, if a bit in the UP of an MLC page is being read, a first read voltage may be provided to the associated access line during the read operation. If a bit in the LP of an MLC page is being read, a second and/or a third read voltage may be provided to the associated access line during the read operation.

Thus, by grouping the memory command and address pairs according to memory plane and page type, the memory 110 may be able to use the same process to retrieve data from the each page associated with the group of memory command and address pairs. That is, the same voltages may be provided to each of the addressed pages. By using the same process to retrieve data from each memory plane, the concurrent access may be performed without necessarily including individual internal controllers for each memory plane or a single multi-thread controller in the memory 150.

Figure 2:
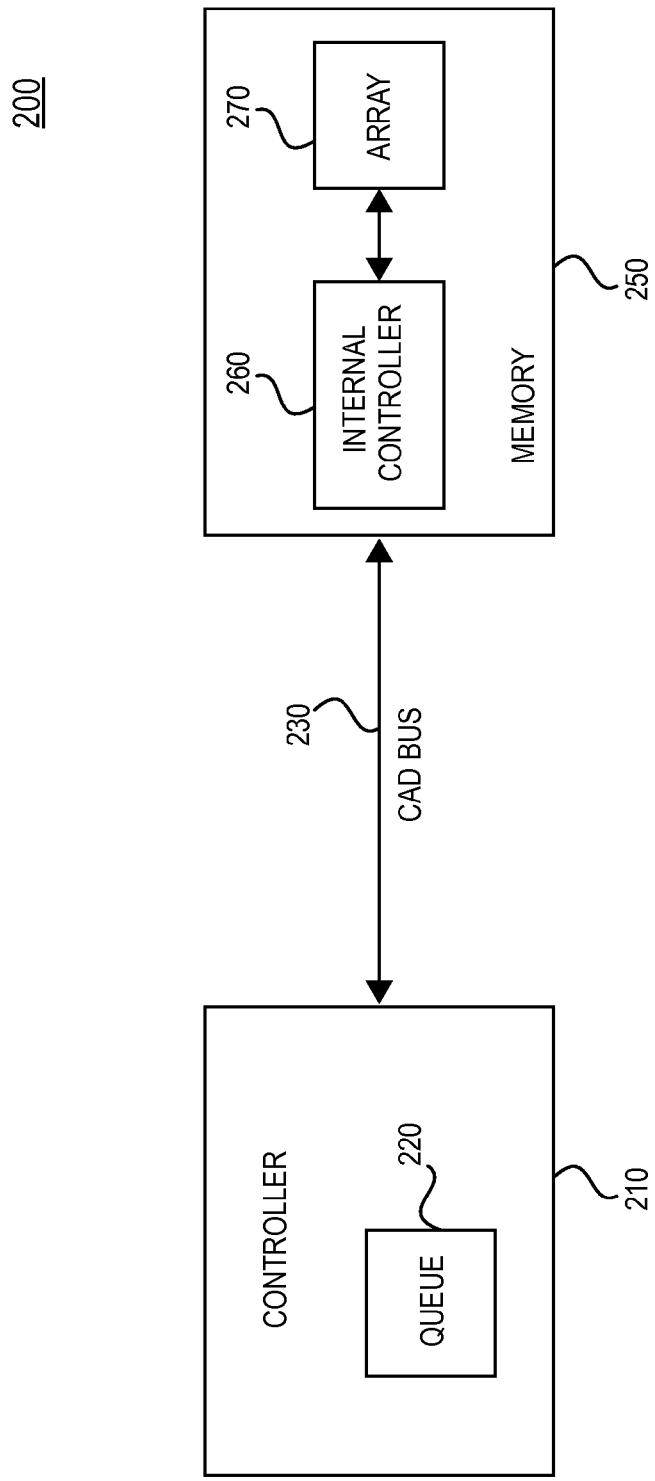
FIG. 2 is a block diagram of a memory system according to an embodiment of the present disclosure.

FIG. 2 is a block diagram of an apparatus 200 according to an embodiment of the present disclosure. The apparatus 200 may include a controller 210 (e.g., memory controller) and a memory 250. The controller 210 may implemented in the controller 110 of FIG. 1, and the memory 250 may be implemented in the memory 150 of FIG. 1. The controller 210 and the memory 250 may be coupled by a command, address, and data (CAD) bus 230. The memory 250 may be configured to receive commands and/or addresses from the controller 210 over the CAD bus 230, and the memory may be configured to receive data and/or provide data over the CAD bus 230. It is understood that the CAD bus 230 may include one or more separate busses for the command, addresses, and data.

In some examples, the memory 250 may be a non-volatile memory, such as NAND, NOR, or PCM flash memory. The memory 250 may include an internal controller 260 coupled to a memory array 270. The memory array 270 may be organized into memory planes, with each memory plane having respective memory cell blocks. Each memory cell block may have a number of pages (e.g., rows or columns) of memory cells corresponding to a number of access lines.

In some embodiments, the memory array 270 may include memory cells that are SLCs, MLCs, TLCs, or combinations thereof.

The internal controller 260 may control memory circuitry for concurrently accessing an individual page of different memory planes of the memory array 270 responsive to a group of memory access command and address pairs received from the 210. For example, the memory 250 may include individual access line driver circuits for each memory plane of the memory array 270. Each individual access line driver circuit may be coupled to the respective memory plane via a respective plurality of global access lines. When more than one memory command and address pair is received at the memory 250 that are each associated with different memory planes of the memory array 270, the internal controller 260 may concurrently provide signals to the individual access line driver circuits of the addressed memory planes to control voltages provided to the corresponding respective plurality of global access lines during memory access operations to erase, program, and/or read from the addressed pages of the different memory planes.

The controller 210 may be associated with a queue 220 that stores information associated with each of a plurality of memory command and access pairs. The controller 210 may select a group of memory command and address pairs from the plurality of memory command and address pairs based on the information stored in the queue 220. The information stored in the queue 220 for each of the plurality of memory command and address pairs may include several fields. For example, the queue 220 may store associated memory plane and page type information for each memory command and address pair. The controller 210 may select the group of commands and address pairs from the plurality of memory command and address pairs from the queue 220 to provide to the memory 250 based on the memory planes and/or page type associated with the command and address pairs of the group.

During operation, the controller 210 may maintain the queue 220 that includes information associated with a plurality of memory command and address pairs. FIG. 3 depicts an exemplary implementation of the queue 220. For example, the example queue 220 depicted in FIG. 3 may include three fields: an address field 310, a memory plane field 320, and a page type field 330. In some embodiments, the example queue 220 may be configured to store information for up to eight memory command and address pairs. It will be appreciated that the queue 220 may have more or less than three fields, and may be configured to store information associated with more or less than eight command and address pairs.

The controller 210 may select a group of memory command and address pairs from the plurality of memory command and address pairs based on the information stored in the queue 220. For example, the controller 210 may select the group of memory command and address pairs from the plurality of memory command and address pairs based on the associated memory plane and/or the associated page type associated with each memory command and address pair. In some examples, the controller 210 may select a command and address pair to add to the group when it is directed to a different memory plane than the other command and address pairs of the group, and is associated with a common page type as the other command and address pairs of the group. The controller 210 may continue to select memory command and address pairs to add to the group until an end of the queue 220 is reached or until the group includes a command and address pair directed to each memory plane of the memory cell 250.

In some embodiments, the controller 210 may generally select memory command and address pairs that meet the earlier described criteria of different memory planes and same page type using a first in, first out (FIFO) methodology. For example, a first selected memory command and address pair of the selected group may be an oldest memory command and address pair included in the queue 220, with additional selections added on a FIFO basis.

In the example provided in FIG. 3, a first entry ADDR0, directed to PLANED and having a LP page type, may be selected for a group. The second entry ADDR1, directed to PLANE0 and having a LP page type, may be skipped for the group because the plane is the same as the PLANE0 of ADDR0. The third entry ADDR2, directed to PLANE1 and a LP page type, may be selected for the group because the memory plane is different than the PLANE0 of ADDR0 and the LP page type matches the LP page type of ADDR0. The fourth entry ADDR3, directed to PLANE2 and having an UP page type, may be skipped for the group because the UP page type is different than the LP page type of ADDR0. The fifth entry ADDR4, directed to PLANE2 and having the LP page type, may be selected for the group because the memory plane is different than the PLANE0 of ADDR0 and the PLANE1 of ADDR2 and the LP page type matches the LP page type of ADDR0. The sixth entry ADDR5, directed to PLANE0 and having a LP page type, may be skipped for the group because the memory plane is the same as the PLANE0 of ADDR0. The seventh entry ADDR5, directed to PLANE3 and having the LP page type, may be selected for the group because the memory plane is different than the PLANE0 of ADDR0, the PLANE1 of ADDR2, and the PLANE2 of ADDR4, and the LP page type matches the LP page type of ADDR0. The eighth entry ADDR7, directed to PLANE2 and having a LP page type, may be skipped for the group because the memory plane is the same as the PLANE2 of ADDR4. Thus, the selected group of memory command and address pairs may include ADDR0, ADDR2, ADDR4, and ADDR6 based on the examples provided in FIG. 3.

The controller 210 may provide the selected group of memory command and address pairs to the memory 250 via the 230 CAD bus. The internal controller 260 may be configured to perform concurrent memory operations (e.g., read operations or program operations) for different memory planes of the memory array 270 in response to the received group of memory command and address pairs.

As previously described, the memory 250 may include individual access line circuits coupled to each memory plane via respective global access lines. The memory 250 may be configured to concurrently perform memory access operations for addresses associated with common page types in different memory planes of the memory array 270. Thus, when the group of memory command and address pairs are associated with a common page type, the process for accessing each address pages is the same, and the internal controller 260 provides (e.g., sends) signals to each individual access line driver circuit to provide voltages to respective global access lines associated with the addressed pages. The individual access line driver circuits may allow different respective pages within different respective blocks of memory cells to be accessed concurrently. For example, a first page of a first block of a first memory plane may be accessed concurrently with a second page of a second block of a second memory plane, provided the second page has a common page type as the first page.

Figure 4:
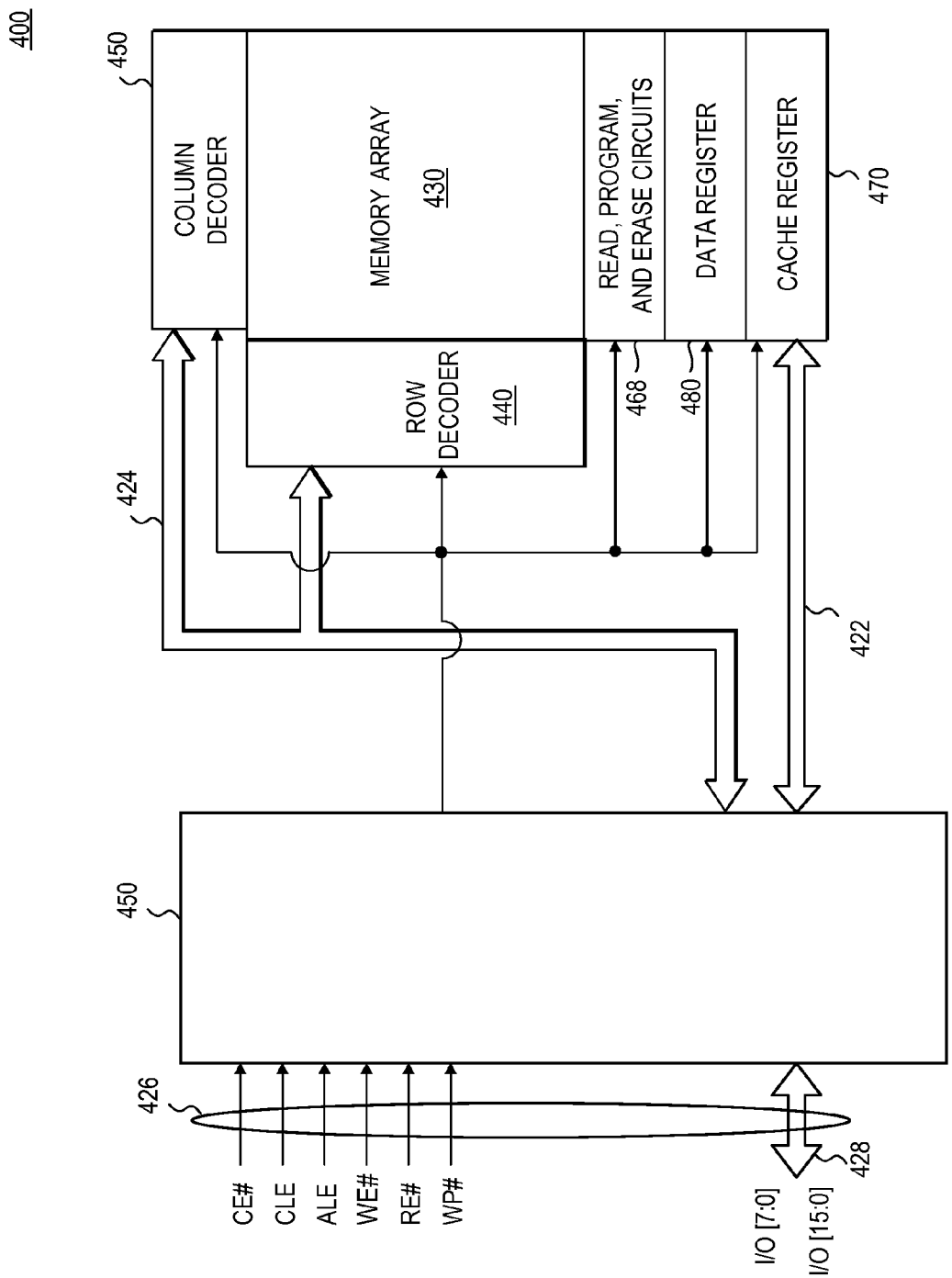
FIG. 4 is a block diagram of an apparatus including a memory according to an embodiment of the present disclosure.

FIG. 4 illustrates a memory 400 according to an embodiment of the present disclosure. The memory 400 includes a memory array 430 with a plurality of memory cells. The memory cells may be non-volatile memory cells, such as NAND flash cells, or may generally be any type of memory cells. The memory 400 may include the memory 150 of FIG. 1 and/or the memory 250 of FIG. 2. In some examples, the memory array 430 may be divided into a plurality of memory planes.

Command signals, address signals and data signals may be provided to the memory 400 as sets of sequential input/output ("I/O") signals transmitted through an I/O bus 428. Similarly, data signals may be provided from the memory 400 through the I/O bus 428. The I/O bus 428 is connected to an I/O control unit 420 that provides (e.g., routes) the signals between the I/O bus 428 and an internal data bus 422, an internal address bus 424, and an internal command bus 426. The memory 400 also includes a control logic unit 410 that receives a number of control signals either externally or through the command bus 426 to control the operation of the memory 400. The combination of the control logic unit 410 and the I/O control unit 420 may facilitate concurrent memory access of different memory planes of the memory array 430.

The address bus 424 provides block-row address signals to a row decoder 440 and column address signals to a column decoder 450. The row decoder 440 and column decoder 450 may be used to select blocks of memory or memory cells for memory operations, for example, read, program, and erase operations. The column decoder 450 may enable data signals to be provided to columns of memory corresponding to the column address signals and allow data signals to be provided from columns corresponding to the column address signals. In some examples, the column decoder 450 and/or the row decoder 440 may include individual access line driver circuits for each memory plane of the memory array 430. The individual access line driver circuits may be coupled to the respective memory planes via a respective plurality of global access lines.

In response to the memory commands decoded by the control logic unit 410, the memory cells in the array 430 are read, programmed, or erased. Read, program, erase circuits 468 coupled to the memory array 430 receive control signals from the control logic unit 410 and include voltage generators for providing various voltages for read, program, and erase operations.

After the row address signals have been provided to the address bus 424, the I/O control unit 420 provides (e.g., routes) data signals to a cache register 470 for a program operation. The data signals are stored in the cache register 470 in successive sets each having a size corresponding to the width of the I/O bus 428. The cache register 470 sequentially stores the sets of data signals for an entire page (e.g., row) of memory cells in the array 430. All of the stored data signals are then used to program a page of memory cells in the array 430 selected by the block-row address coupled through the address bus 424. In a similar manner, during a read operation, data signals from a page of memory cells selected by the block-row address coupled through the address bus 424 are stored in a data register 480. Sets of data signals corresponding in size to the width of the I/O bus 428 are then sequentially transferred through the I/O control unit 420 from the cache register 470 to the I/O bus 428.

Figure 5:
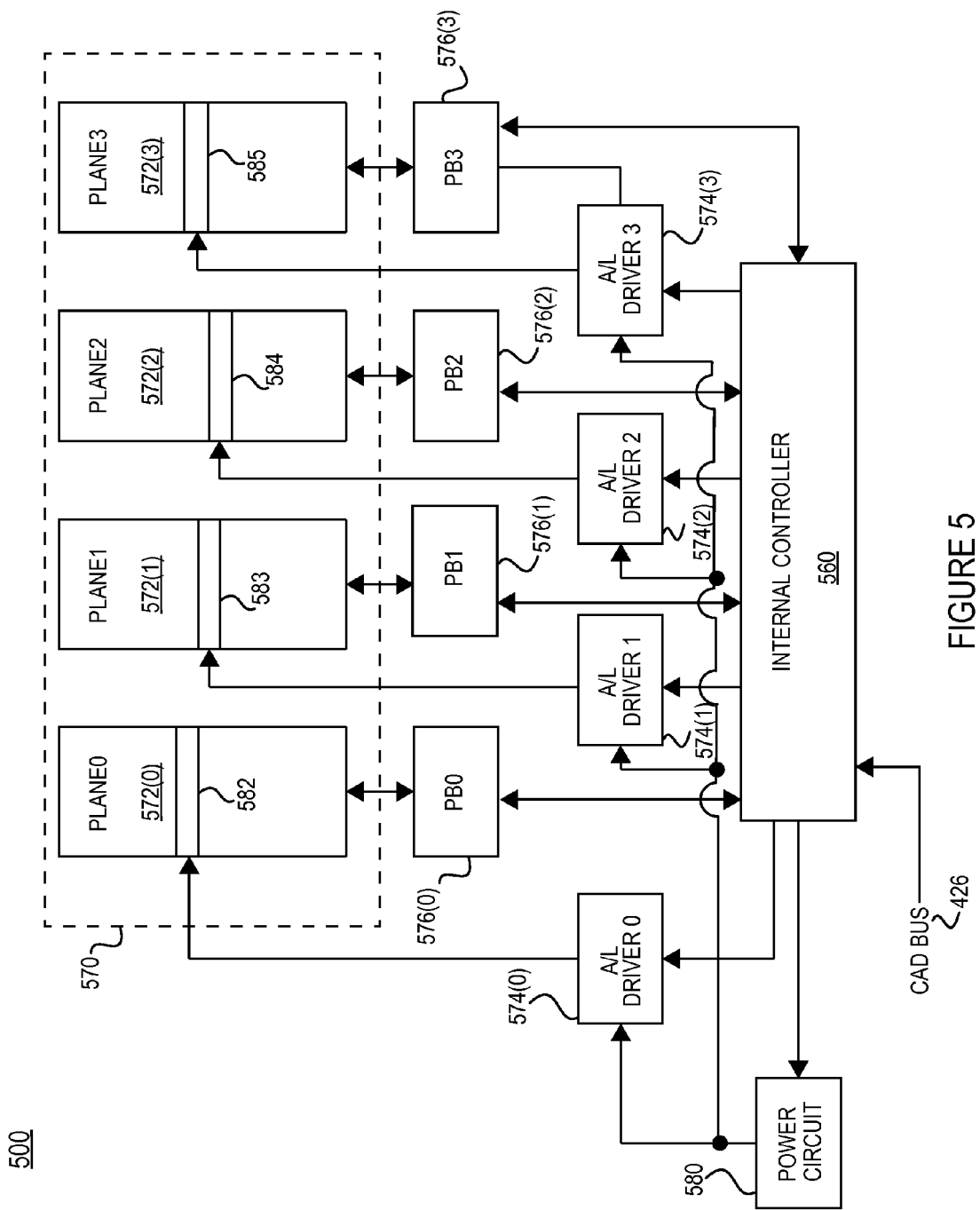
FIG. 5 is a block diagram of an apparatus including a memory according to an embodiment of the present disclosure.

FIG. 5 illustrates a portion of memory 500 according to an embodiment of the present disclosure. The memory 500 includes a memory array 570 with a plurality of memory planes 572(0)-572(3) that each includes a respective plurality of memory cells. The memory 500 may be implemented in the memory 150 of FIG. 1, the memory 250 of FIG. 2, and/or the memory 400 of FIG. 4. The memory cells may be non-volatile memory cells, such as NAND flash cells, or may generally be any type of memory cells.

The memory planes 572(0)-572(3) may each be divided into blocks of data, with a different relative block of data from each of the memory planes 572(0)-572(3) concurrently accessible during memory access operations associated with a common page type. For example, during memory access operations associated with a common page type, data block 582 of the memory plane 572(0), data block 583 of the memory plane 572(1), data block 584 of the memory plane 572(2), and data block 585 of the memory plane 572(3) may each be accessed concurrently.

Each of the memory planes 572(0)-572(3) may be coupled to a respective page buffer PB0-PB3 576(0)-(3), respectively. Each PB0-PB3 576(0)-576(3) may be configured to provide data to or receive data from the respective memory plane 572(0)-572(3). The PB0-PB3 576(0)-576(3) may be controlled by the internal controller 560.

Each of the memory planes 572(0)-572(3) may be further coupled to a respective access line driver circuit 574(0)-574(3), respectively. The A/L driver circuits 574(0)-574(3) may be configured to condition a page of a respective block of an associated memory plane 572(0)-572(3) for a memory access operation, such as programming data, reading data, or erasing data. The A/L driver circuits 574(0)-574(3) may be controlled based on signals from the internal controller 560. Each of the A/L driver circuits 574(0)-(3) may be coupled to a power circuit 580, and may provide voltages to respective wordlines based on voltages provided by the power circuit 580. The voltages provided by the power circuit 580 may be based on signals received from the internal controller 560.

The internal controller 560 may control the A/L driver circuits 574(0)-574(3), page buffers PB0-PB3 576(0)-576(3), and the power circuit 580 to concurrently perform memory access operations associated with each of a group of memory command and address pairs (received from a controller, such as the controller 110 of FIG. 1 and/or the controller 210 of FIG. 2). For example, the internal controller 560 may control the A/L driver circuits 574(0)-574(3), the page buffers PB0-PB3 576(0)-576(3), and the power circuit 580 to perform the concurrent memory access operations. The internal controller 560 may be implemented in the control logic unit 410 and/or the I/O control unit 420 of FIG. 4, for example.

In operation, the internal controller 560 may receive a group of memory command and address pairs, with each pair arriving in parallel or serially. In some examples, the group of memory command and address pairs are each associated with a common page type and different respective memory planes 572(0)-572(3) of the memory array 570. The internal controller 560 may be configured to perform concurrent memory operations (e.g., read operations or program operations) across the different memory planes 572(0)-572(3) of the memory array 570 responsive to the group of memory command and address pairs.

For example, the internal controller 560 may provide signals to the A/L driver circuits 574(0)-574(3) that are coupled to the memory planes 572(0)-572(3) associated with the group of memory command and address pairs. The internal controller 560 may also provide (e.g., send) signals to the power circuit 580, and the power circuit 580 may provide voltages to the A/L driver circuits 574(0)-574(3). The voltages provided by the power circuit 580 may depend on a page type associated with the memory access operations. The power circuit 580 may be configured to concurrently perform memory access operations for addresses associated with common page types in each memory plane 572(0)-572(3) of the memory array 570. Thus, when the group of memory command and address pairs are associated with a common page type, the process for accessing each address pages is common, and the internal controller 560 provides signals to associated individual A/L driver circuits 574(0)-574(3) to provide voltages to global access lines associated with the addressed pages.

As previously described, each A/L driver circuit 574(0)-574(3) may be coupled to a respective memory plane 572(0)-572(3) via respective global access lines. Thus, based on the signals received from the internal controller 560, the A/L driver circuits 574(0)-574(3) that are coupled to the memory planes 572(0)-572(3) associated with the group of memory command and address pairs may select blocks of memory or memory cells from each associated memory plane 572(0)-572(3), for memory operations, such as read, program, and/or erase operations. The individual A/L driver circuits 574(0)-574(3) may drive different respective global access lines within the respective plurality of global access lines. As an example, the A/L driver circuit 574(0) may drive a first voltage on a first global access line of a first plurality of global access lines, the A/L driver circuit 574(1) may drive the first voltage on a third global access line of a second plurality of global access lines, the A/L driver circuit 574(2) may drive the first voltage on a seventh global access line of a third plurality of global access lines, etc., and second voltages may be driven on each of the remaining global access lines of the first, second, third, etc., plurality of global access lines. The individual A/L driver circuits may allow different respective pages within different respective blocks of memory cells to be accessed concurrently. For example, a first page of a first block of a first memory plane may be accessed concurrently with a second page of a second block of a second memory plane, provided the second page has a common page type as the first page.

The page buffers PB0-PB3 576(0)-576(3) may provide data to or receive data from the internal controller 560 during the memory access operations responsive to signals from the internal controller 560 and the respective memory planes 572(0)-572(3). The internal controller 560 may provide the received data to a controller, such as the controller 110 of FIG. 1 and/or the controller 210 of FIG. 2.

It will be appreciated that the memory 500 may include more or less than four memory planes, A/L drivers, and page buffers. It will also be appreciated that the respective plurality of global access lines may include 8, 16, 32, 64, 128, etc., global access lines. The internal controller 560 and the individual A/L driver circuits 574(0)-574(3) may allow accessing different respective pages within different respective blocks of different memory planes concurrently when the different respective pages are of a common page type, which may improve concurrent access during random addressing of the memory 500.

From the foregoing it will be appreciated that, although specific embodiments of the disclosure have been described herein for purposes of illustration, various modifications may be made without deviating from the spirit and scope of the disclosure. Accordingly, the disclosure is not limited except as by the appended claims.

What is claimed is:

1. An apparatus, comprising:
a controller associated with a queue configured to maintain a plurality of command and address pairs and respective information associated with each of the plurality of memory command and address pairs, wherein, using the respective information maintained in the queue, the controller is configured to select a group of memory command and address pairs from the plurality of memory command and address pairs, wherein the queue includes a first field configured to store a respective address identifier for each entry, a second field configured to store a respective memory plane identifier for each entry, and a third field configured to store a respective page type identifier for each entry, wherein each of the first field, the second field, and the third field are non-overlapping fields in the queue; and
a memory coupled to the controller via the command, address, and data bus and comprising an internal controller and a memory array divided into a plurality of memory planes, the memory configured to receive the group of memory command and address pairs from the controller via the command, address, and data bus and configured to concurrently perform memory access operations associated with the group of memory command and address pairs; wherein
the respective information associated with each of the plurality of memory command and address pairs includes an associated memory plane of the plurality of memory planes stored as the memory plane identifier in the second field of the queue and an associated page type stored as the page type identifier in the third field of the queue, wherein the associated page type includes a level of memory cells being accessed; and
the controller is configured to select the group of memory command and address pairs from the plurality of memory command and address pairs based on the memory plane identifier from the second field of the queue and the level of memory cells being accessed associated with each of the plurality of memory command and address pairs based on the page type identifier from the third field of the queue, wherein the controller is configured to use the respective information maintained in the queue to select the group of memory command and address pairs from the plurality of memory command and address pairs to identify which command and address pairs of the plurality of command and address pairs are able to be concurrently executed by the memory as a criterion for inclusion in the group of memory command and address pairs.

2. The apparatus of claim 1, wherein each of the group of memory command and address pairs selected by the controller are associated with a different respective memory plane of the plurality of memory planes than any other memory command and address pair of the group of memory command and address pairs.

3. The apparatus of claim 2, wherein the controller is configured to select the group of memory command and address pairs from the plurality of memory command and address pairs based on the associated page type being common with the associated page type of the other memory command and address pairs selected for the group of memory command and address pairs.

4. The apparatus of claim 1, wherein the queue is configured to store a plurality of entries, wherein each individual entry of the plurality of entries includes the respective information associated with an individual memory command and address pair of the plurality of memory command and address pairs.

5. The apparatus of claim 4, wherein each entry of the plurality of entries stored in the queue comprises:
an address associated with the respective memory command and address pair;
a memory plane of a plurality of memory planes of the memory associated with the respective memory command and address pair; and
a page type associated with the respective memory command and address pair.

6. The apparatus of claim 4, wherein the memory comprises four memory planes, and wherein the plurality of entries of the queue comprises eight entries.

7. The apparatus of claim 1, wherein the memory comprises a plurality of access line driver circuits, wherein each of the plurality of access line driver circuits is configured to drive a respective global access line of a respective memory plane of the plurality of memory planes.

8. The apparatus of claim 7, wherein the internal controller is configured to control access line driver circuits of the plurality of access line driver circuits based on the group of memory command and address pairs.

9. The apparatus of claim 8, wherein the memory further comprises a power circuit configured to control access line voltages provided to each of the plurality of access line driver circuits responsive to the internal controller.

10. An apparatus, comprising:
a controller coupled to a memory via a command, address, and data bus, the controller associated with a queue configured to maintain a plurality of command and address pairs and respective information associated with each of the plurality of memory command and address pairs, wherein the queue includes a first field configured to store a respective address identifier for each entry, a second field configured to store a respective memory plane identifier for each entry, and a third field configured to store a respective page type identifier for each entry, wherein each of the first field, the second field, and the third field are non-overlapping fields in the queue, wherein the respective information associated with each of the plurality of memory command and address pairs includes an associated memory plane of the plurality of memory planes stored as the memory plane identifier in the second field of the queue and an associated page type stored as the page type identifier in the third field of the queue, wherein the associated page type includes a level of memory cells being accessed, wherein, using the respective information maintained in the queue, the controller is configured to select a group of memory command and address pairs from the plurality of memory command and address pairs, the controller configured to provide the group of memory command and address pairs to a memory having an internal controller and a memory array;
wherein each memory command and address pair of the group of memory command and address pairs selected by the controller are associated with different memory planes based on the memory plane identifiers in the second field of the queue and have a common level of the memory cells being accessed with the other memory command and address pairs of the group of memory command and address pairs based on the page type identifiers in the third field of the queue, wherein the controller is configured to use the respective information maintained in the queue to select the group of memory command and address pairs from the plurality of memory command and address pairs to identify which command and address pairs of the plurality of command and address pairs are able to be concurrently executed by the memory as a criterion for inclusion in the group of memory command and address pairs.

11. The apparatus of claim 10, wherein the controller is configured to select the group of memory command and address pairs from the memory command and address pairs based on a first in, first out, methodology.

12. The apparatus of claim 10, wherein the queue is configured to store memory plane information and page type associated with each of the plurality of memory command and address pairs.

13. A method, comprising:
selecting a group of memory command and address pairs from a plurality of memory command and address pairs maintained by a queue associated with a controller using respective information associated with each of the plurality of memory command and address pairs, wherein the queue includes the command and address pairs and the respective information, wherein the queue includes a first field configured to store a respective address identifier for each entry, a second field configured to store a respective memory plane identifier for each entry, and a third field configured to store a respective page type identifier for each entry, wherein each of the first field, the second field, and the third field are non-overlapping fields in the queue; and
providing the group of memory command and address pairs to a memory having an internal controller and a memory array via a command, address, and data bus, wherein the memory concurrently performs memory access operations associated with each memory command and address pair of the group of memory command and address pairs at the memory;
wherein the information associated with each of a plurality of memory command and address pairs maintained by the queue comprises respective memory plane information stored as the memory plane identifier in the second field of the queue and respective page type stored as the page type identifier in the third field of the queue associated with each of the plurality of memory command and address pairs, the respective page type associated with each of the plurality of memory command and address pairs including a level of memory cells being accessed, wherein use of the respective information included in the queue to select the group of memory command and address pairs from the plurality of memory command and address pairs is to identify which command and address pairs of the plurality of command and address pairs are able to be concurrently executed by the memory as a criterion for inclusion in the group of memory command and address pairs.

14. The method of claim 13, wherein each memory command and address pair of the group of memory command and address pairs is associated with a memory access operation to a respective memory plane included in the memory.

15. The method of claim 13, wherein selecting the group of memory command and address pairs from the plurality of memory command and address pairs comprises selecting memory command and address pairs that are associated with a different memory plane from any other memory command and address pair of the group of memory command and address pairs.

16. The method of claim 15, wherein selecting the group of memory command and address pairs from the plurality of memory command and address pairs further comprises selecting memory command and address pairs that are associated with a same page type as the other memory command and address pairs of the group of memory command and address pairs.

17. The method of claim 13, wherein providing the group of memory command and address pairs to the memory to concurrently perform memory access operations associated with each memory command and address pair of the group of memory command and address pairs comprises providing the group of memory command and address pairs to the memory to concurrently perform a respective memory access operation on two or more memory planes of a plurality of memory planes of the memory.

18. The method of claim 17, wherein providing the group of memory command and address pairs to the memory to concurrently perform the memory access operations associated with each memory command and address pair of the group of memory command and address pairs at the memory comprises providing the group of memory command and address pairs to the memory to concurrently control respective individual access line driver circuits coupled to the two or more memory planes of the plurality of memory planes of the memory.

19. The method of claim 18, wherein providing the group of memory command and address pairs to the memory to concurrently control respective individual access line driver circuits coupled to each of the two or more memory planes of the plurality of memory planes of the memory comprises providing the group of memory command and address pairs to the memory to control a power circuit of the memory, wherein the power circuit provides power to each of the respective individual access line driver circuits coupled to the two or more memory planes.

20. A method, comprising:
maintaining a queue that includes a plurality of command and address pairs and respective information associated each of the plurality of memory command and address pairs, wherein the queue is associated with a controller coupled to a memory via a command, address, and data bus, wherein the queue includes a first field configured to store a respective address identifier for each entry, a second field configured to store a respective memory plane identifier for each entry, and a third field configured to store a respective page type identifier for each entry, wherein each of the first field, the second field, and the third field are non-overlapping fields in the queue; and
selecting a group of memory command and address pairs from the plurality of memory command and address pairs using the respective information associated with each memory command and address pair of the plurality of memory command and address pairs, wherein use of the respective information included in the queue to select the group of memory command and address pairs from the plurality of memory command and address pairs is to identify which command and address pairs of the plurality of command and address pairs are able to be concurrently executed by the memory as a criterion for inclusion in the group of memory command and address pairs;

wherein maintaining the respective information associated each of a plurality of memory command and address pairs with the queue comprises storing respective memory plane information stored as the memory plane identifier in the second field of the queue and respective page type stored as the page type identifier in the second field of the queue associated with each of the plurality of memory command and address pairs, wherein the respective page type associated with each of the plurality of memory command and address pairs is based on a memory cell type and based on a memory cell level.

21. The method of claim 20, wherein selecting the group of memory command and address pairs from the plurality of memory command and address pairs comprises selecting memory command and address pairs associated with a common page type.

22. The method of claim 21, wherein selecting the group of memory command and address pairs from the plurality of memory command and address pairs comprises selecting memory command and address pairs of the plurality of memory command and address pairs associated with different respective memory planes.

\* \* \* \* \*